United States Patent
Minter et al.

(10) Patent No.: US 6,577,716 B1
(45) Date of Patent: Jun. 10, 2003

(54) INTERNET RADIO SYSTEM WITH SELECTIVE REPLACEMENT CAPABILITY

(76) Inventors: David D. Minter, 7172 S. Robb St., Littleton, CO (US) 80127; Albert S. Baldocchi, 1601 High St., Boulder, CO (US) 80304

( * ) Notice: Subject to any disclaimer, the term of this patent is extended or adjusted under 35 U.S.C. 154(b) by 0 days.

(21) Appl. No.: 09/465,740

(22) Filed: Dec. 17, 1999

Related U.S. Application Data

(60) Provisional application No. 60/113,469, filed on Dec. 23, 1998.

(51) Int. Cl.[7] .............................................. H04M 11/00
(52) U.S. Cl. ................................ 379/101.01; 379/90.01
(58) Field of Search ......................... 379/101.01, 90.01; 370/352, 353, 354, 355; 709/217, 218, 219

(56) References Cited

U.S. PATENT DOCUMENTS

| | | | |
|---|---|---|---|
| 5,535,229 A | 7/1996 | Hain, Jr. et al. | 371/53 |
| 5,600,366 A | 2/1997 | Schulman | 348/9 |
| 5,708,478 A | 1/1998 | Tognazzini | 348/552 |
| 5,715,018 A | 2/1998 | Fasciano et al. | 348/722 |
| 5,774,170 A | 6/1998 | Hite et al. | 348/9 |
| 5,805,974 A | 9/1998 | Hite et al. | 455/3.2 |
| 5,809,242 A | 9/1998 | Shaw et al. | 395/200.47 |
| 5,931,901 A | 8/1999 | Wolfe et al. | 709/206 |
| 6,223,210 B1 * | 4/2001 | Hickey | 709/203 |
| 6,314,094 B1 * | 11/2001 | Boys | 370/352 |

OTHER PUBLICATIONS

"Radio Broadcasting Network: Satellite Distribution Systems," McGraw–Hill Encyclopedia of Science & Technology, 8th ed., vol. 15, c. 1997, pp. 72–73.

* cited by examiner

*Primary Examiner*—Stella Woo
(74) *Attorney, Agent, or Firm*—Holland & Hart LLP; Christopher J. Kulish, Esq.

(57) ABSTRACT

The present invention is directed to distributing content over the Internet that is comprised of a portion of the content of a radio station broadcast and content that has replaced a portion of the content of the radio station broadcast.

14 Claims, 2 Drawing Sheets

INTERNET RADIO SYSTEM WITH SELECTIVE REPLACEMENT CAPABILITY

CROSS-REFERENCE TO RELATED APPLICATION

This application claims priority form U.S. Provisional Application Serial No. 60/113,469, filed Dec. 23, 1998.

FIELD OF THE INVENTION

The present invention relates to the distribution of broadcast radio content over the Internet or other computer network.

BACKGROUND OF THE INVENTION

Presently, there are over one thousand broadcast radio stations that are distributing their content as live, streaming audio signals over the Internet. The distribution of the content of a radio broadcast over the Internet begins by converting the analog, audio signal broadcast by the radio station into a digital format, known as a streaming audio format, that is suitable for transmission over the Internet. The streaming audio signal is then provided to a web server that, in turn, distributes the streaming audio signal over the Internet. Consumers with Internet and streaming audio capability can access and listen to the radio programs distributed over the Internet.

SUMMARY OF THE INVENTION

Many broadcast radio stations are only capable of transmitting their radio signals over a limited geographical range. As a consequence, much of the content in these broadcasts is local in nature. For example, much of the advertising is local in nature. Further, traffic and weather updates and local news and sports segments are all typically, only of local importance. The distribution of a local radio broadcast over the Internet makes the content of the local radio broadcast available over a much broader geographical range, e.g., globally. The portion of this content that is local in nature is unlikely to be of any great interest to the portion of the audience that resides outside of the range of the local radio broadcast. Moreover, in the case of local advertisers, it is unlikely that they will be willing to pay more to have their advertising distributed over the Internet because there is unlikely to be any meaningful increase in their sales due to their advertising being distributed over a greater geographical area.

The present invention is directed to the replacement of the portion of the content in a radio station broadcast that is distributed over the Internet that is local in nature or otherwise unsuitable for the Internet audience with content that is relevant to the broader audience that is capable of receiving the Internet broadcast. For instance, the time in the local radio broadcast dedicated to local sports and weather can be replaced with an advertisement that is directed to a regional, national or international audience, such as a car advertisement.

DETAILED DESCRIPTION

Figure 1:
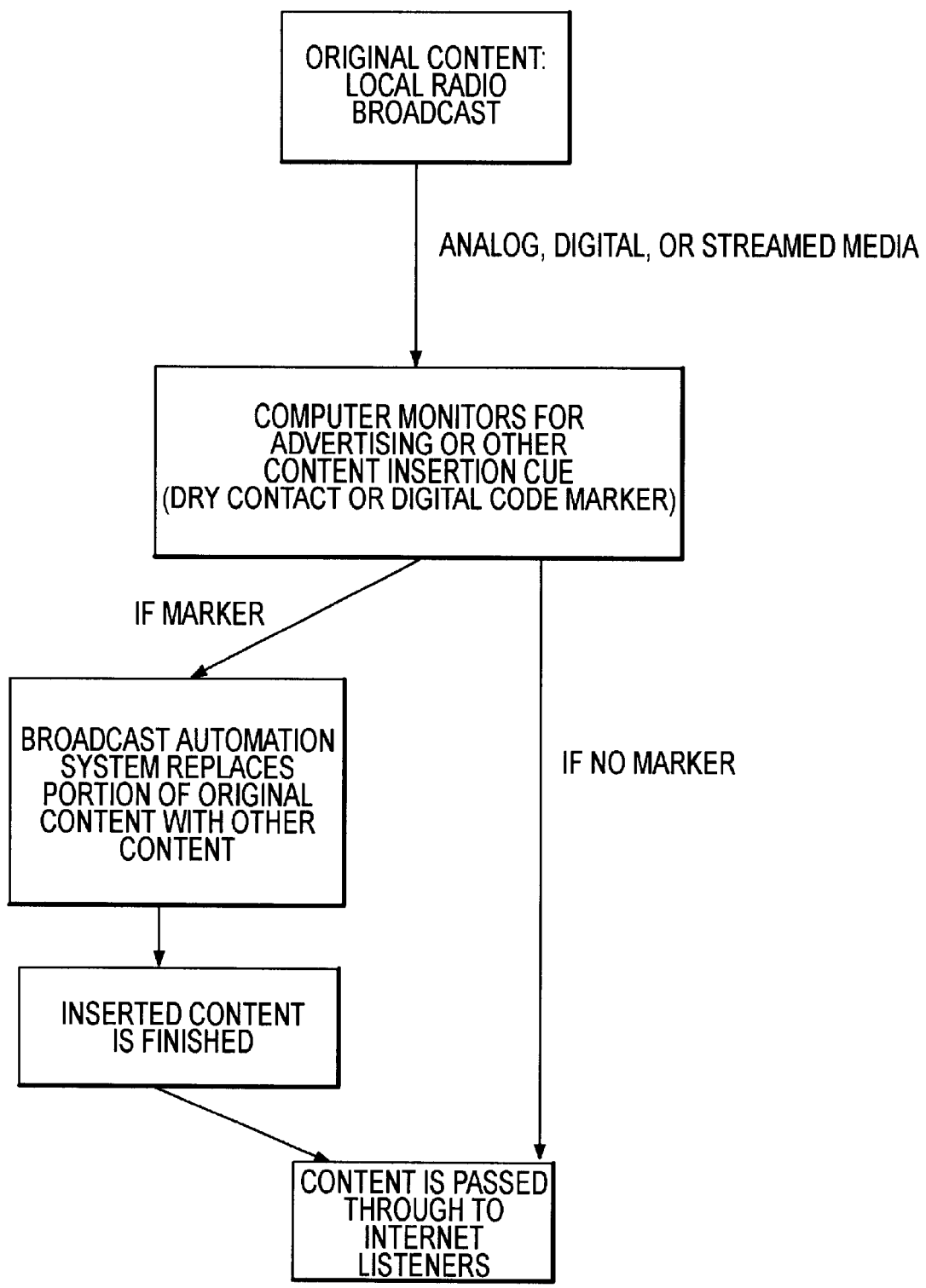
FIG. 1 is a flow chart that illustrates the replacement of the content of a radio broadcast that is of a local character with other content prior to distribution of the broadcast over the Internet.
Figure 2:
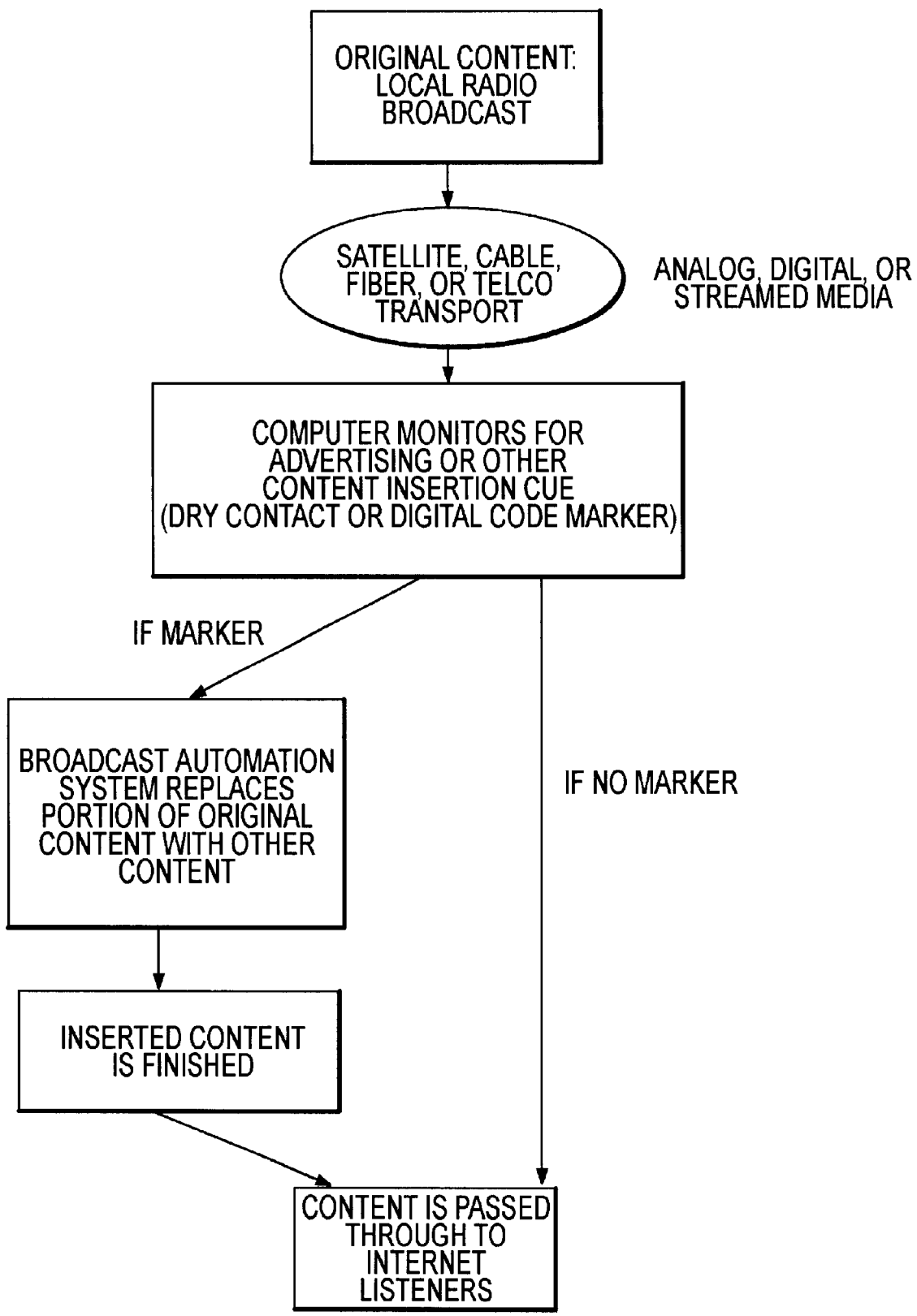
FIG. 2 is a flow chart that illustrates the replacement of the content of a radio broadcast that is of a local character and received over one or a combination of communication systems with other content prior to distribution of the broadcast over the Internet.

With reference to FIGS. 1 and 2, which are exemplary in nature, the present invention is directed to the replacement of the portion of the content of a radio broadcast that is local in nature or otherwise unsuitable for an Internet/computer network audience with other content prior to the distribution of the radio broadcast over the Internet or other computer network. The invention involves the use of a computer system for receiving the original content of a radio broadcast, identifying the presence of a marker in the original content that indicates that content of a local or unsuitable character is about to be transmitted, replacing the local or unsuitable content with other content before the content is distributed over the Internet or other computer network.

The content received by the computer system can be in analog or digital form. The content can also be in streaming form, i.e., a digital form that is suitable for distribution over the Internet or other computer network. The content received by the computer system may also have been transmitted from the radio station to the computer system over one or a combination of communication networks. For instance, the content could be transmitted over land line systems, such as cable, fiber optic and conventional telephone lines. The content also could have been transmitted over wireless systems, such as satellite and cellular systems. Additionally, the content could be transmitted over the Internet. In any event, the computer system is capable of processing the content regardless of the communication system or systems that were used to transmit it from the radio station to the computer system or the form in which the content might be received. Further, the computer system assures that the content is in a format that is suitable for distribution over the Internet or other computer network.

The computer system monitors the received content for a marker that indicates a change in the type of content. For instance, the marker may indicate that a song is about to end and be followed by a local news spot. Presently, radio stations utilize what is termed a "dry contact closure" to indicate a change in the type of content. The dry contact closure is contained in a sub-channel of the broadcast and is not discernible by the listening audience. However, the dry contact is electronically detectable. If the dry contact closure is detected, the computer system replaces the subsequent content of a local or unsuitable nature with other content before the content is distributed over the Internet. For instance, a local advertisement can be replaced with a national advertisement.

The detection of a dry contact closure requires that the computer system be provided with a script of the radio broadcast that provides the anticipated times at which there will be a change in content and the duration of at least the types of content that are to be replaced. For instance, a radio broadcast script might indicate that at or about every quarter hour there will a local advertisement of one minute in length. Using this script, the computer system would know that the local advertisements that are preceded by a dry contact closure at or about each quarter hour can be replaced with other content, such as national advertisements, that are of one minute in duration.

The dry contact closure system and related scripting has certain drawbacks. Namely, the occurrence of some unforeseen event could significantly reduce the reliability of the script. Consequently, the invention is also capable of processing more sophisticated types of markers. For instance, the computer system can process markers that indicate the type of content that is to follow the occurrence of the marker. For instance, the marker can indicate that the subsequent content is music, talk, local news, local sports, a local advertisement, a national advertisement, weather, traffic etc. The ability to discern the type of content that is to follow the marker provides increased flexibility by allowing selective replacement of the content. For example, it may be desirable to allow the local news to be distributed over the Internet, while replacing the local weather segment with a national advertisement.

Another more sophisticated type of marker that can be processed by the computer system indicates the duration of the subsequent content. For instance, the marker may indicate that the subsequent content has a duration of one minute. The script or marker may also identify the type of subsequent content as a local advertisement, which is to be replaced with a national advertisement. In this case, the computer system discerns the duration of the content that is to be replaced and operates to replace the local advertisement with a national advertisement of one minute in duration. By having the duration embodied in the marker, greater flexibility is realized. For instance, if there was a change in the script of a radio broadcast that required a one minute advertisement to be shortened to a thirty second advertisement, the computer system would be able to adapt to this change and insert content of the appropriate duration.

With respect to content that is not to be replaced, the computer system assures that the content is in the appropriate form for distribution over the network. Ultimately, the content that is distributed over the Internet is a combination of the radio broadcast content and content that has replaced a portion of the radio broadcast. The resulting content comprised of the original radio broadcast content and the replacement content is provided to the Internet. The resulting content is then transmitted over the Internet to those computers that have accessed the Internet address associated with the resulting content.

What is claimed is:

1. A method for replacing a portion of the content of a radio broadcast that is to be distributed over the Internet, the method comprising:

receiving the content of a radio broadcast that has been transmitted by a radio station;

identifying, following the step of receiving, a marker associated with the content that is indicative of a change in the type of the content of the radio broadcast from a first content type to a second content type;

replacing, following the step of identifying and when the second content type is of a type that is applicable to listeners located within the geographical range of the radio broadcast but unlikely to be applicable to individuals located outside of the geographical range of the radio broadcast, a portion of the content of the received radio broadcast that is of the second content type with content of a selected content type that is applicable to individuals located outside the geographical range of the radio broadcast, said marker being used to determine a point in time at which the portion of the content of the second content type is to be replaced with content of the selected content type, wherein said step of replacing produces a revised content; and providing, following the step of replacing, the revised content of the radio broadcast for distribution over the Internet.

2. A method, as claimed in claim 1, wherein:
said second content type is a local advertisement.

3. A method, as claimed in claim 1, wherein:
said step of identifying includes determining a duration of said second content type.

4. A method, as claimed in claim 1, wherein:
said step of identifying includes determining the type of said second content type.

5. A method, as claimed in claim 1, wherein:
said second content type is a local traffic report.

6. A method, as claimed in claim 1, wherein:
said second content type is a local weather report.

7. A method, as claimed in claim 1, wherein:
said second content type is a local news report.

8. A method, as claimed in claim 1, wherein:
said second content type is a local sports report.

9. A method, as claimed in claim 1, wherein:
said step of identifying includes determining a duration of said second content type using a radio broadcast script.

10. A method, as claimed in claim 1, wherein:
said step of identifying includes determining a duration of said second content type using the marker.

11. A method, as claimed in claim 1, wherein:
said step of identifying includes determining the type of said second content type using a radio broadcast script.

12. A method, as claimed in claim 1, wherein:
said step of identifying includes determining the type of said second content type using the marker.

13. A method, as claimed in claim 1, wherein:
said step of providing includes providing content of the first content type with content of the selected content type.

14. A method for distributing a portion of the content of a radio station broadcast over the Internet, the method comprising:

receiving first content that is less than all of the content of a radio station broadcast, wherein all of the content of the content of the radio station broadcast comprises first content and second content that is applicable to listeners located within the geographical range of the radio broadcast but unlikely to be applicable to individuals located outside the geographical range of the radio broadcast;

receiving third content that replaces at least a portion of the second content of the radio station broadcast that was not received in said first receiving step; and distributing said first content and said third content over the Internet.

* * * * *